(12) United States Patent
Daniel (10) Patent No.: US 10,529,339 B2
(45) Date of Patent: Jan. 7, 2020

(54) METHOD AND SYSTEM FOR FACILITATING RELIABLE PATTERN DETECTION

(71) Applicant: NXP B.V., Eindhoven (NL)

(72) Inventor: Adrien Daniel, Antibes (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/908,382

(22) Filed: Feb. 28, 2018

(65) Prior Publication Data
US 2018/0261228 A1    Sep. 13, 2018

(30) Foreign Application Priority Data

Mar. 8, 2017   (EP) .................................... 17305247

(51) Int. Cl.
| | | |
|---|---|---|
| *G10L 17/18* | (2013.01) | |
| *G06N 3/04* | (2006.01) | |
| *G10L 17/00* | (2013.01) | |
| *G10L 25/30* | (2013.01) | |
| *G10L 25/93* | (2013.01) | |

(Continued)

(52) U.S. Cl.
CPC .............. *G10L 17/18* (2013.01); *G06N 3/049* (2013.01); *G06N 3/0454* (2013.01); *G06N 3/08* (2013.01); *G10L 17/005* (2013.01); *G10L 25/30* (2013.01); *G10L 25/93* (2013.01); *G10L 17/04* (2013.01)

(58) Field of Classification Search
CPC ......... G10L 17/18; G10L 25/30; G10L 25/93; G10L 17/04; G10L 17/005; G06N 3/0454; G06N 3/049; G06N 3/08; G06N 3/086

See application file for complete search history.

(56) References Cited

U.S. PATENT DOCUMENTS 5,479,576 A * 12/1995 Watanabe ................ G06N 3/08
706/25
2007/0288236 A1   12/2007 Kim
(Continued)

FOREIGN PATENT DOCUMENTS

WO    WO-98/54694 A1    12/1998
WO    WO-2014/109847 A1    7/2014

OTHER PUBLICATIONS

Xu, Juan et al; "Speaker Identification with Whispered Speech Using Unvoiced-consonant Phonemes"; IEEE International Conference on Image Analysis and Signal Processing: pp. 1-4 (Nov. 9, 2012).

(Continued)

*Primary Examiner* — Mohammad K Islam (57) ABSTRACT

According to a first aspect of the present disclosure, a method for facilitating detection of one or more time series patterns is conceived, comprising building one or more artificial neural networks, wherein, for at least one time series pattern to be detected, a specific one of said artificial neural networks is built, the specific one of said artificial neural networks being configured to produce a decision output and a reliability output, wherein the reliability output is indicative of the reliability of the decision output. According to a second aspect of the present disclosure, a corresponding computer program is provided. According to a third aspect of the present disclosure, a corresponding system for facilitating the detection of one or more time series patterns is provided.

13 Claims, 6 Drawing Sheets

(51) Int. Cl.
     *G06N 3/08*    (2006.01)
     *G10L 17/04*   (2013.01)

(56) References Cited

U.S. PATENT DOCUMENTS

| | | |
|---|---|---|
| 2008/0267419 A1 | 10/2008 | DeBoer et al. |
| 2013/0262096 A1* | 10/2013 | Wilhelms-Tricarico ............... G10L 25/90 704/202 |
| 2014/0195236 A1* | 7/2014 | Hosom ............ G10L 17/18 704/249 |
| 2015/0106310 A1* | 4/2015 | Birdwell ............ G06F 16/22 706/20 |
| 2016/0093313 A1* | 3/2016 | Vickers ............ G10L 25/78 704/232 |
| 2017/0061282 A1* | 3/2017 | Ryskamp ............ G06N 3/088 |
| 2017/0229117 A1* | 8/2017 | van der Made ....... G06N 3/049 |
| 2018/0012120 A1 | 1/2018 | Daniel |
| 2018/0157934 A1* | 6/2018 | Hu ............ G06K 9/00791 |
| 2018/0174600 A1* | 6/2018 | Chaudhuri ........ G06K 9/00288 |

OTHER PUBLICATIONS

Stanley, Kenneth O. et al; "Envolving Neural Networks through Augmenting Topologies"; Journal Evolutionary Computation, vol. 10, Issue 2, The MIT Press Journals; pp. 99-127 (Summer 2002).

* cited by examiner

METHOD AND SYSTEM FOR FACILITATING RELIABLE PATTERN DETECTION

CROSS-REFERENCE TO RELATED APPLICATIONS

This application claims the priority under 35 U.S.C. § 119 of European patent application no. 17305247.3, filed Mar. 8, 2017 the contents of which are incorporated by reference herein.

FIELD

The present disclosure relates to a method for facilitating the detection of one or more time series patterns. Furthermore, the present disclosure relates to a corresponding computer program and a corresponding system.

BACKGROUND

Time series patterns are patterns of data points made over continuous time intervals out of successive measurements across said intervals, using equal spacing between every two consecutive measurements and with each time unit within the time intervals having at most one data point. Examples of time series patterns are audio patterns, such as sound patterns and human speech patterns. It may be useful to detect specific time series patterns, for example in order to recognize particular events or contexts (e.g., starting a car or being present in a running car) and to distinguish and identify different speakers. Furthermore, it may be useful to make such detections easier and more reliable.

SUMMARY

According to a first aspect of the present disclosure, a method for facilitating detection of one or more time series patterns is conceived, the method comprising building one or more artificial neural networks, wherein, for at least one time series pattern to be detected, a specific one of said artificial neural networks is built, the specific one of said artificial neural networks being configured to produce a decision output and a reliability output, wherein the reliability output is indicative of the reliability of the decision output.

In one or more embodiments, the specific one of the artificial neural networks comprises a decision output unit and a reliability output unit, wherein the decision output unit is configured to produce the decision output, and wherein the reliability output unit is configured to produce the reliability output.

In one or more embodiments, the specific one of the artificial neural networks is configured to assign a weight to the decision output based on the reliability output.

In one or more embodiments, the specific one of the artificial neural networks is configured to ignore the decision output based on the reliability output.

In one or more embodiments, building said artificial neural networks comprises employing neuroevolution of augmenting topologies.

In one or more embodiments, the artificial neural networks are stored for subsequent use in a detection task.

In one or more embodiments, each time series pattern to be detected represents a class of said detection task.

In one or more embodiments, said time series patterns are audio patterns.

In one or more embodiments, a raw time series signal is provided as an input to each artificial neural network that is built.

In one or more embodiments, the audio patterns include at least one of the group of: voiced speech, unvoiced speech, user-specific speech, contextual sound, a sound event.

In one or more embodiments, the detection of the time series patterns forms part of a speaker authentication function.

In one or more embodiments, for each speaker to be authenticated, at least one artificial neural network is built for detecting speech segments of said speaker.

In one or more embodiments, for each speaker to be authenticated, an artificial neural network is built for detecting voiced speech segments of said speaker, and another artificial neural network is built for detecting unvoiced speech segments of said speaker.

According to a second aspect of the present disclosure, a computer program is provided that comprises non-transient instructions which, when executed, carry out or control a method of the kind set forth.

According to a third aspect of the present disclosure, a system for facilitating detection of one or more time series patterns is provided, the system comprising a network building unit configured to build one or more artificial neural networks, wherein, for at least one time series pattern to be detected, the network building unit is configured to build a specific one of said artificial neural networks, the specific one of said artificial neural networks being configured to produce a decision output and a reliability output, wherein the reliability output is indicative of the reliability of the decision output.

DESCRIPTION OF DRAWINGS

Embodiments will be described in more detail with reference to the appended drawings, in which.

DESCRIPTION OF EMBODIMENTS

As mentioned above, it may be useful to make the detection of time series patterns easier and more reliable. For example, in order to recognize particular audio events or contexts and to distinguish and identify different speakers, it may be necessary to detect specific time series patterns in an audio signal. This should be done in a reliable manner, to avoid misidentifications.

In an example, a set of features is computed from an input signal before the input signal is classified. The so-called Mel-Frequency Cepstral Coefficients (MFCCs) are an example of such features. Then, the extracted features are provided to a classifier that performs the classification task. The extraction of features reduces the input dimensionality, which in turn facilitates the classification task. However, reducing the input dimensionality may also negatively impact the pattern detection process. For instance, in case of a speaker authentication task, the same set of features is extracted, whoever the target speaker is. This impedes catching the characteristics that are very specific to a given speaker, which in turn may result in misidentifications. In accordance with the present disclosure, building an artificial neural network (ANN) which is specific for the time series pattern corresponding to the target speaker facilitates catching the characteristics that are specific to said speaker. In particular, the specific ANN may subsequently be used as a classifier that may receive an input signal (e.g., a raw input signal that has not been preprocessed by a feature extractor), and that may detect the time series pattern corresponding to the target speaker within said signal. It is noted that the ANN may be built, at least partially, by a computer program in the manner as described herein by way of example. The inventor has found that the presently disclosed method and corresponding system are particularly suitable for facilitating the detection of audio patterns; however, their application is not limited thereto.

Furthermore, in accordance with the present disclosure, the ANN is evolved in such a way that it produces a decision output and a reliability output, wherein the reliability output is indicative of the reliability of the decision output. In a practical and efficient implementation, the ANN comprises a decision output unit and a reliability output unit. In that case, the decision output unit is configured to produce the decision output, and the reliability output unit is configured to produce the reliability output. The decision output represents a detection decision, e.g. a value that indicates a degree or extent to which the current time series input matches a target pattern. The reliability output indicates how reliable the decision output is. In other words, it indicates how suitable the decision output is for actual use in the detection task. Thus, the reliability output may be referred to as a reliability indicator.

It may be envisaged, for example, that some samples of an audio pattern are more suitable for use in a speaker authentication task than other samples. For instance, input samples containing voiced segments—i.e. vowel-like—are likely suitable, because different speakers utter these sounds in very different ways. In contrast, input samples that contain periods of silence are likely less suitable for use in a speaker authentication task. In accordance with the present disclosure, the ANN is evolved with the purpose of indicating the different degrees of reliability of the output samples. In this example, the evolved ANN will output a detection decision and a reliability indicator during both voiced inputs and silences. During voiced inputs, the ANN may output a reliability indicator having a high value, because at that moment its output may be highly reliable. During silences, the ANN may output a reliability indicator having a low value, because at that moment its output may be unreliable. These reliability indicators may be used to assign weights to the respective detection decisions, for example. Thus, in one or more embodiments, the ANN is configured to assign a weight to the decision output based on the reliability output. Also, the reliability indicators may be used for ignoring unsuitable output samples. Thus, in one or more embodiments, the ANN is configured to ignore the decision output based on the reliability output. These reliability outputs allow to evolve a network that does not need to output a reliable decision at all times. It is stressed that it is left up to the evolution process to build the behavior of the reliability output. The above example is only an envision of what this behavior might be for a speaker authentication task.

Figure 1:
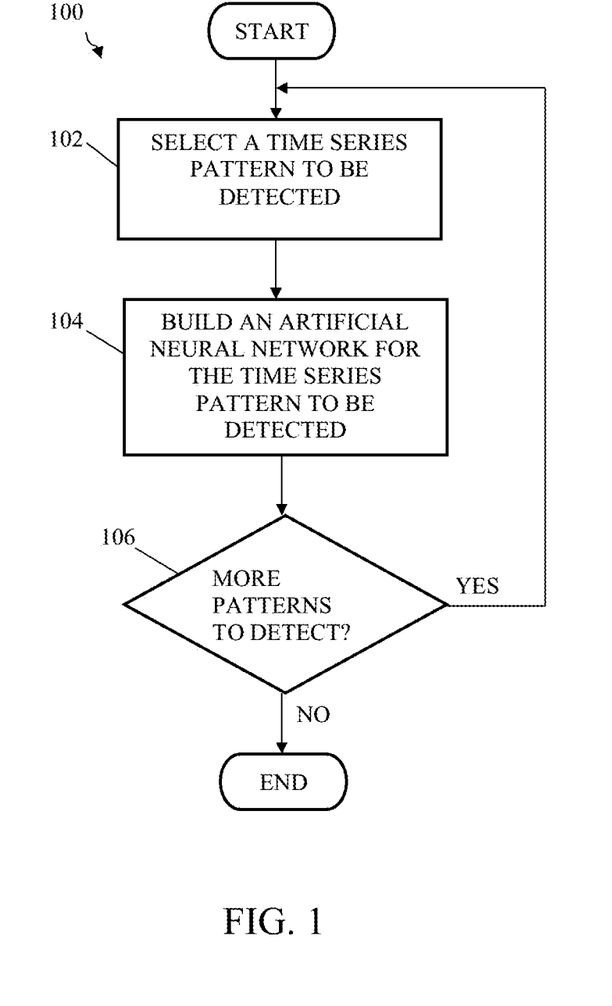
FIG. 1 shows an illustrative embodiment of a pattern detection facilitation method.

FIG. 1 shows an illustrative embodiment of a pattern detection facilitation method 100. The method 100 comprises, at 102, selecting a time series pattern to be detected. For instance, the selected time series pattern may be an audio pattern, in particular user-specific speech, voiced speech (vowels), unvoiced speech (consonants), contextual sound (e.g., a running car) or a sound event (e.g., starting a car). Furthermore, the method 100 comprises, at 104, building an ANN for the selected time series pattern. As mentioned above, the ANN is configured to produce at least two outputs; the reliability output is indicative of the reliability of the decision output. Then, at 106, it is checked whether more time series patterns should be detected. If so, the method 100 repeats steps 102 and 104 for each further time series pattern to be detected. If there are no more patterns to detect, the method 100 ends.

In one or more embodiments, building the ANNs comprises employing neuroevolution of augmenting topologies (NEAT). In this way, it is easier to find the specificity of selected time series patterns and the resulting ANNs may have a minimal topology, so that computing resources may be saved. Neuroevolution refers to a method for artificially evolving neural networks using genetic algorithms. The product obtained when applying such a method is called an artificial neural network (ANN); simple example ANNs are described herein with reference to FIG. 5(A), FIG. 5(B) and FIG. 5(C). Furthermore, NEAT refers to a neuroevolution method wherein the structure of an evolving neural network is grown incrementally, such that the topology of the network may be minimized. More specifically, the number of network nodes and the connections therebetween may be kept to a minimum, while the network still performs the desired task. The NEAT methodology has been described in, among others, US 2008/0267419 A1 and the article "Evolving Neural Networks through Augmenting Topologies", by Kenneth O. Stanley and Risto Miikkulainen in the journal Evolutionary Computation, Volume 10 Issue 2, Summer 2002, pages 99-127.

Figure 2:
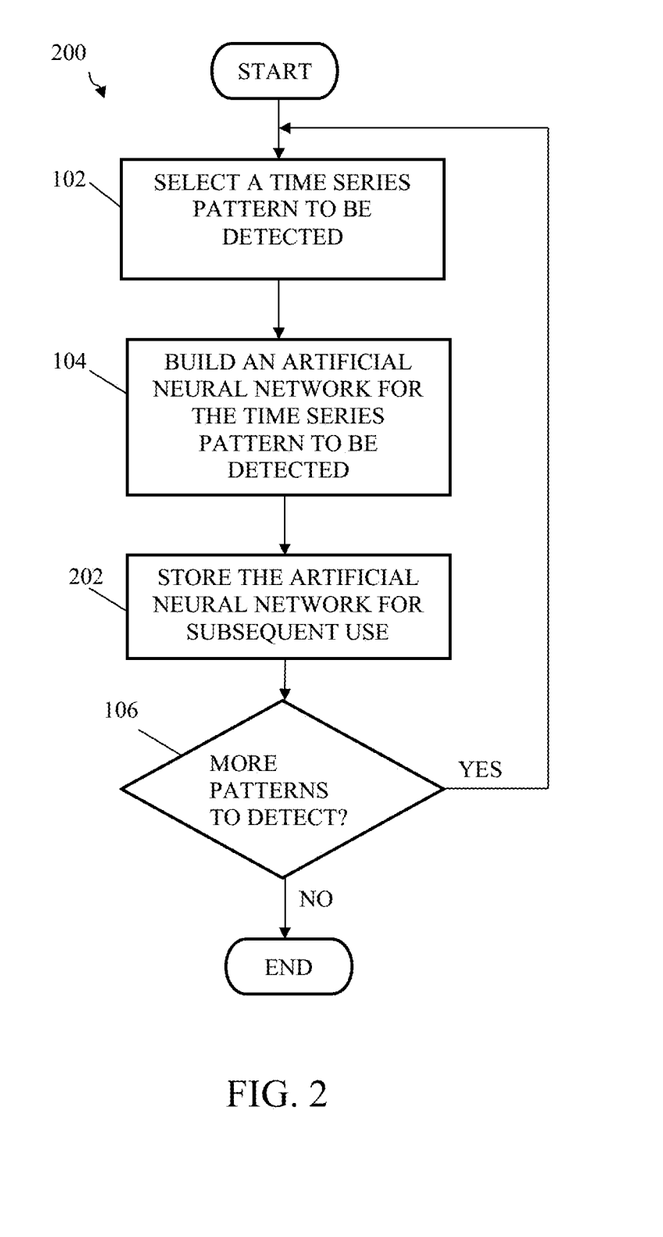
FIG. 2 shows another illustrative embodiment of a pattern detection facilitation method.

FIG. 2 shows another illustrative embodiment of a pattern detection facilitation method 200. The method 200 comprises, in addition to the steps 102, 104, 106, already shown in FIG. 1, storing, at 202, each ANN built in step 104 for subsequent use. Thereby, the use of the ANN or ANNs in a pattern detection task may be facilitated. The ANN or ANNs may for example be stored in a memory of a pattern detection system or pattern detection device that performs said pattern detection task.

In one or more embodiments, each time series pattern to be detected represents a class of a pattern detection task. Thus, more specifically, a separate ANN may be evolved for each class of the detection task; the ANN thus effectively constitutes a model of the class. Normally, pattern detectors extract, for a given task, the same set of features for all classes. In other words, depending on its coordinates in a fixed space, a given feature vector will be classified as belonging to class C. This means that for instance, in an audio context recognition task, class "car" is distinguished from class "office" within the same feature space. In a speaker authentication task, speaker A and speaker B are authenticated within the same feature space. That is to say, speaker A is distinguished from any other speaker within the same space as for speaker B. In both examples, using the same feature space for all classes reduces the power of exploiting the specificities of each class. By evolving a separate ANN for each class or each speaker of the detection task, this may be avoided. Furthermore, in one or more embodiments, a raw time series signal is provided as an input to each artificial neural network that is built. In that case, it is left to the network to extract the relevant features for the pattern to be detected, and it is more likely that the specific characteristics of said pattern are caught. That is to say, the aforementioned commonly used feature extractor may be omitted.

Figure 3:
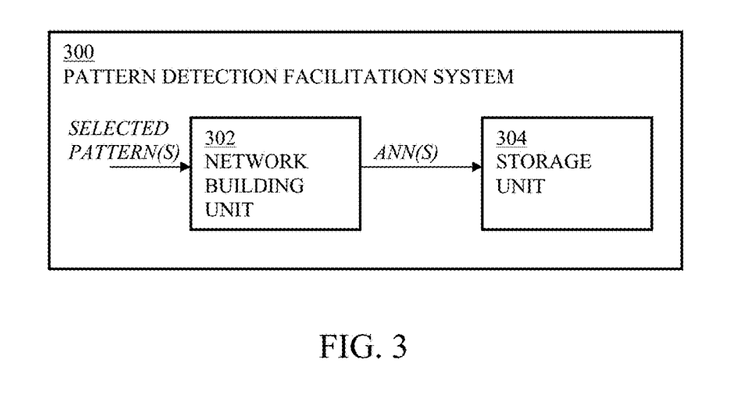
FIG. 3 shows an illustrative embodiment of a pattern detection facilitation system.

FIG. 3 shows an illustrative embodiment of a pattern detection facilitation system 300. The system 300 comprises a network building unit 302 operatively coupled to a storage unit 304. The network building unit 302 is configured to build one or more ANNs. In particular, the network building unit 302 is configured to build, for each selected time series pattern to be detected, a specific ANN. Furthermore, the network building unit 302 may be configured to store the ANN or ANNs in the storage unit 304. The storage unit 304 may be any memory which is suitable for integration into the system 300.

Figure 4:
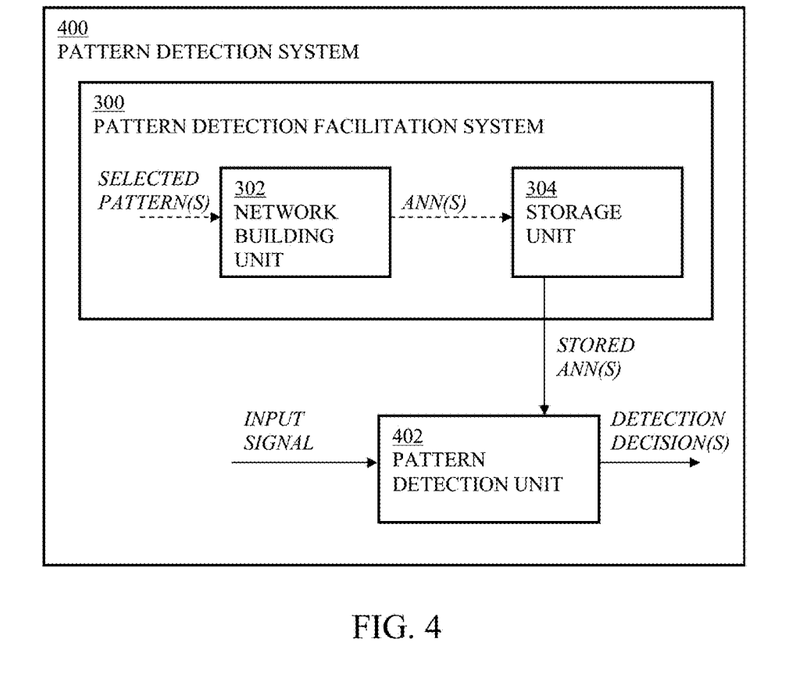
FIG. 4 shows an illustrative embodiment of a pattern detection system.

FIG. 4 shows an illustrative embodiment of a pattern detection system 400. The pattern detection system 400 comprises the pattern detection facilitation system 300 shown in FIG. 3. The pattern detection facilitation system 300 may build and store one or more ANNs which are specific to selected time series patterns to be detected; this may be done, for example, in a training or enrolment mode of the pattern detection system 400. Furthermore, the pattern detection system 400 comprises a pattern detection unit 402 operatively coupled to the storage unit 304. The pattern detection unit 402 may detect one or more time series patterns in an input signal provided to said pattern detection unit 402, and output one or more corresponding detection decisions. This may be done, for instance, in an operational mode of the pattern detection system 400. In a practical and efficient implementation, a detection decision may be represented by a simple Boolean variable: one value may represent a "pattern detected" decision, while the other value may represent a "pattern not detected" decision. A detection decision may also be represented by a plurality of values, wherein each value indicates a degree or extent to which the current time series input matches a target pattern.

Figure 5A:
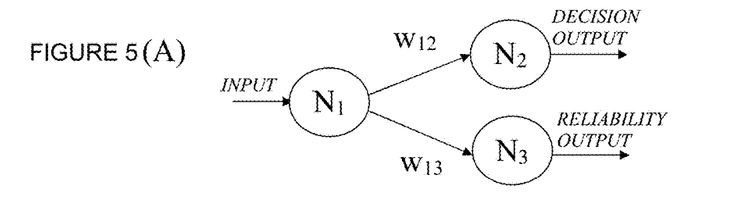
FIG. 5(A), FIG. 5(B), and FIG. 5(C) show illustrative embodiments of artificial neural networks.
Figure 5B:
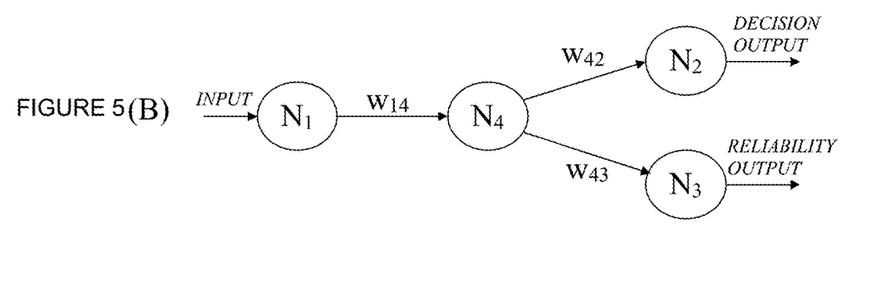
Figure 5C:
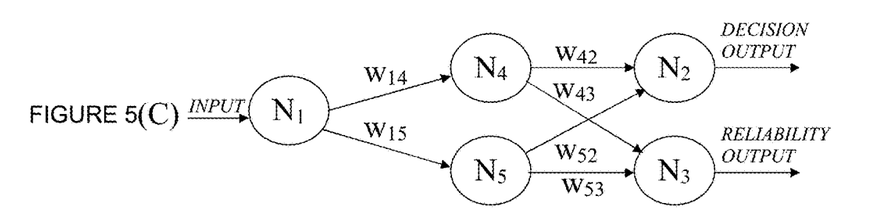

FIG. 5(A), FIG. 5(B) and FIG. 5(C) show illustrative embodiments of artificial neural networks. In particular, they show examples of ANNs that may be evolved in accordance with the present disclosure. Each network node $N_1$-$N_5$ represents a processing element that forms part of a pattern detection task. Each processing elements performs a function on its received input. In the field of ANNs, the network nodes $N_4$ in FIG. 5(B), and $N_4$ and $N_5$ in FIG. 5(C), are often referred to as hidden nodes. Furthermore, the network nodes $N_1$-$N_5$ are connected to each other by connections having a certain weight $w_{12}$, $w_{13}$, $w_{14}$, $w_{42}$, $w_{43}$, $w_{15}$, $w_{52}$, $w_{53}$. In accordance with the principles of an ANN, the input to a processing element is multiplied by the weight of the connection through which the input is received. According to the principles of NEAT, an evolving ANN is grown incrementally. For example, initially a simple ANN may be chosen, as shown in FIG. 5(A), and it may be tested by means of a fitness function whether this simple ANN would correctly detect a selected pattern. If the fitness function has an output below a certain threshold, the ANN under development may be extended, for example by adding one or more network nodes and/or connections, following evolutionary heuristics. For instance, the simple ANN of FIG. 5(A) may be extended to the ANN shown in FIG. 5(B). Again, it may be tested by means of said fitness function whether the ANN would correctly detect a selected pattern.

If not, the ANN under development may be again extended, for example to the ANN shown in FIG. 5(C). Eventually, this iterative process may yield another ANN (not shown) that correctly detects the selected pattern. It is noted that the process illustrated in FIG. 5(A), FIG. 5(B) and FIG. 5(C) is a simplified process. In reality, for example, hidden nodes are not necessarily added in "parallel" (i.e. across a single layer), but they can follow any topology. Furthermore, connections are not necessarily forward connections, but they can be recurrent as well.

In the following explanation, the term "unit" refers to a node in an ANN. Specifically, the term "input unit" refers to a node that receives the input for the whole ANN, for example node $N_1$ in FIG. 5(A), FIG. 5(B) and FIG. 5(C). This input should not be confused with the (weighted) inputs of the individual nodes of the ANN, as discussed above. Furthermore, the term "output unit" refers to a node that produces an output of the ANN, for example node $N_2$ and $N_3$ FIG. 5(A), FIG. 5(B) and FIG. 5(C). It is noted that an ANN may have multiple inputs and/or multiple outputs. In accordance with the present disclosure, the reliability output (produced by output unit $N_3$) indicates the reliability of the decision output (produced by output unit $N_2$).

In general, NEAT requires specifying an optimization setup. In particular, the following should be specified:

the number of input units of the ANN to evolve;

the number of output units of the ANN to evolve;

a fitness function, which is used to evaluate and identify the best solutions among a population of evolved, individual ANNs.

In a simple implementation the presently disclosed method and system may use NEAT to evolve an ANN that takes a single input, i.e. one sample of a time series input signal, and two outputs, i.e. a detection decision and a reliability indicator. For a given generation, each individual of the population of solution candidates will be evaluated using the fitness function. Hence this fitness function should reflect the way in which the ANN is intended to be used in practice.

The speaker authentication problem may be taken as an example. The fitness function may feed a test speech signal of length N into an individual ANN under consideration and evaluate its output. To do so, each sample of the test speech signal (i.e. each input sample) is placed, one after the other, at the input of the ANN, and one single activation step will be performed. An activation step consists of propagating the output of each unit (including the output of the input unit and the output of a bias unit) to the unit to which they are connected, and then updating the outputs of all units (including the output of the output units). The bias unit is an input unit with a constant value, usually 1. It permits to add any constant value to the input of any unit in the network by creating a connection from the bias unit.

By repeating this operation until the entire input signal has been fed into the network and reading at each step the value out of the output units $N_2$ and $N_3$, an output signal is obtained. Let input[i] be the $i^{th}$ sample of the input signal, and output$_D$[i] be the decision output from output unit $N_2$ and output$_R$[i] be the reliability output from output unit $N_3$ for the same sample. Let us first compute the average weighted decision output$_W$[i] over a sliding window of K samples:

$$output_w[i] = \frac{\sum_{j=0}^{K-1} output_D[i-j] * output_R[i-j]}{\sum_{j=0}^{K-1} output_R[i-j]}$$

Assuming that output units $N_2$ and $N_3$ yield respectively $output_D$ and $output_R$ values in the ]0,1[ range, by means for instance of an unsigned sigmoid activation function, and thus that $output_W$ have values in that same range, the simplest fitness value can be expressed as:

$$\text{fitness} = \frac{1}{N} \sum_{i=0}^{N-1} 1 - |\text{truth}[i] - output_w[i]|$$

where truth[i] equals 1 when input[i] corresponds to the target speaker, and 0 when input[i] corresponds to another (non-target) speaker, and is not defined otherwise (e.g. during silences or when only non-vocal sounds are present). This value is returned as the fitness of the individual under evaluation.

The proposed evaluation algorithm can be summarized as:
0. Start with pointer i=0
1. Place input[i] as the output of the input unit of the ANN
2. Perform one activation step of the ANN
3. Store the outputs of output units $N_2$ and $N_3$ of the ANN as $output_D[i]$ and $output_R[i]$, respectively
4. If i<N−1, increase i by one and go to step 1
5. Compute the average weighted decision $output_W$
6. Compute and return the fitness for this individual Once all individuals of the population of the current generation have been evaluated, those with a higher fitness are kept to generate the population of the next generation. When the champion of the current generation gives satisfying results (e.g., when the fitness value of the champion exceeds a predefined threshold) the optimization process has finished. In this example, this champion is the evolved ANN that is stored for subsequent use in the pattern detection task.

In accordance with the present disclosure, this optimization process may be performed for each class to detect. Taking the example of a speaker authentication task, an ANN may be evolved for each speaker to authenticate. The test input signal is a speech signal wherein each sample is either part of a speech segment uttered by the target speaker, or by one of a cohort of non-target (impostor) speakers. To improve performance on the speaker authentication task, two ANNs may be evolved for each speaker: one to authenticate on voiced segments and one to authenticate on unvoiced segments.

Figure 6:
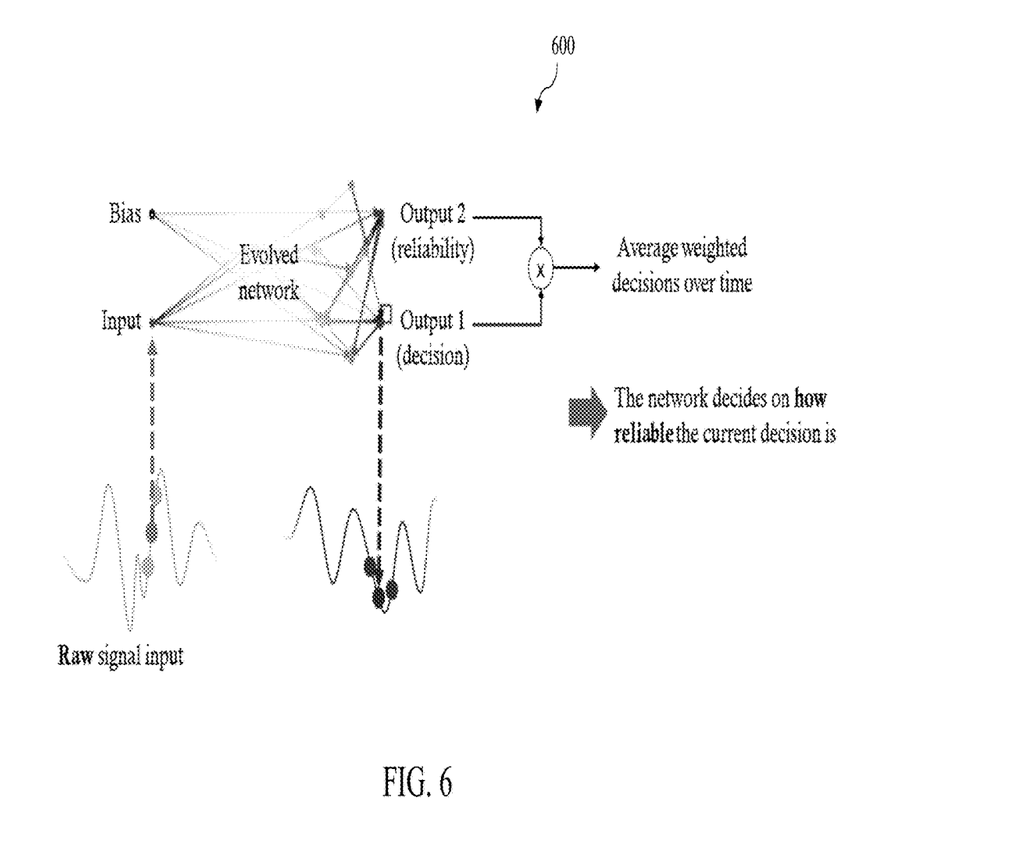
FIG. 6 shows another illustrative embodiment of an artificial neural network.

FIG. 6 shows another illustrative embodiment of an artificial neural network 600. The ANN 600 comprises a plurality of network nodes: a bias node, an input node, a plurality of intermediate nodes (not shown), a decision output node (output unit) and a reliability output node (output unit). The decision output node produces a decision output (Output 1) that represents a detection decision. The reliability output node produces a reliability output (Output 2) that represents a reliability indicator. In this example, the weighting amounts to assigning a weight to a detection decision in dependence on the value of the reliability output (Output 2). Since the time series input comprises a sequence of samples, and the ANN outputs a detection decision and reliability indicator for each sample of this time series input, the final output of the detection system may be an average of weighted detection decisions over time.

Figure 7:
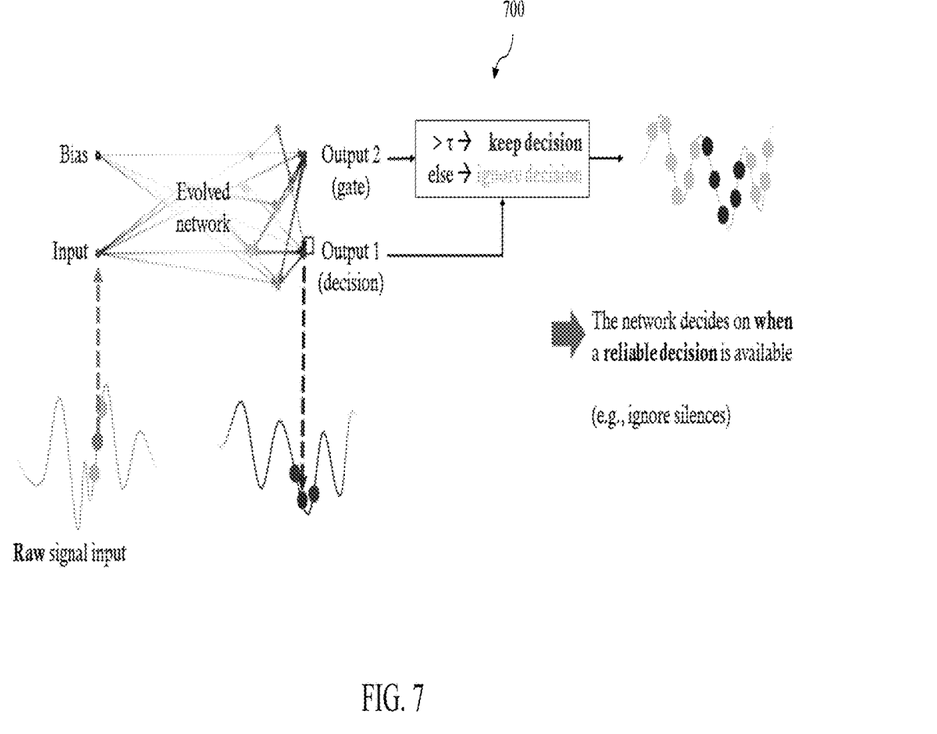
FIG. 7 shows a further illustrative embodiment of an artificial neural network.

FIG. 7 shows a further illustrative embodiment of an artificial neural network 700. The ANN 700 comprises a plurality of network nodes: a bias node, an input node, a plurality of intermediate nodes (not shown), a decision output node (output unit) and a reliability output node (output unit). The decision output node produces a decision output (Output 1) that represents a detection decision. The reliability output node produces a reliability output (Output 2) that represents a reliability indicator or gate. In this example, the gating amounts to comparing the value of the reliability output with a threshold $\tau$. If the value of the reliability output exceeds the threshold $\tau$, the decision output is kept; otherwise the decision output is ignored. The final output of the detection system may be an average of kept detection decisions over time.

In more complex applications of the presently disclosed method and system, the ANN to evolve may have multiple inputs, especially when a variant of NEAT like HyperNEAT is used, and/or multiple decision outputs. Multiple decision outputs are especially useful when the ANN is not expected to output a decision value, but rather a feature vector meant to be fed into a subsequent classifier such as a support vector machine (SVM). The training and testing of this classifier may then be included in the fitness function.

It is noted that in some applications, there might be several decision outputs. For instance, a network can be trained to recognize the voice of any of the members of a family at home. Then the network could be setup to have one decision output per member plus one reliability output. In general, the network could be setup with one decision output per class plus one reliability output. The detected class is the one of which the average weighted decision has the highest value. Note that in the particular case of binary problems, like speaker authentication, the network can be either setup to have a single decision output plus a reliability output, or it can be setup with two decision outputs (one for the target class and one for the non-target class) and one reliability output.

As mentioned above, the presently disclosed method and system are particularly useful for facilitating the detection of audio patterns. For example, the following use cases of the presently disclosed method and system are envisaged: audio context recognition (e.g., car, office, park), predefined audio pattern recognition (e.g. baby cry, glass breaking, fire alarm), speaker authentication/recognition, voice activity detection (i.e., detection of the presence of speech in a signal), and voicing probability (i.e., vowel/consonant distinction in a speech signal).

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 pattern detection facilitation method
102 select a time series pattern to be detected
104 build an artificial neural network for the time series pattern to be detected
106 more patterns to detect?
200 pattern detection facilitation method
202 store the artificial neural network for subsequent use
300 pattern detection facilitation system
302 network building unit
304 storage unit
400 pattern detection system
402 pattern detection unit
$N_1$-$N_5$ network nodes
$w_{12}$ connection weight
$w_{13}$ connection weight
$w_{14}$ connection weight
$w_{42}$ connection weight
$w_{43}$ connection weight
$w_{15}$ connection weight
$w_{52}$ connection weight
$w_{53}$ connection weight
600 artificial neural network
700 artificial neural network

The invention claimed is:
1. A method for facilitating detection of one or more time series patterns, comprising
  building one or more artificial neural networks,
    wherein, for at least one time series pattern to be detected, a specific one of said artificial neural networks is built,
    the specific one of said artificial neural networks being configured to produce a decision output and a reliability output,
    wherein the reliability output is indicative of the reliability of the decision output;
    wherein the detection of the time series patterns forms part of a speaker authentication function;
    wherein, for each speaker to be authenticated, at least one artificial neural network is built for detecting speech segments of said speaker; and
    wherein, for each speaker to be authenticated, an artificial neural network is built for detecting voiced speech segments of said speaker, and another artificial neural network is built for detecting unvoiced speech segments of said speaker.

2. A method as claimed in claim 1,
wherein the specific one of the artificial neural networks comprises a decision output unit and a reliability output unit,
wherein the decision output unit is configured to produce the decision output, and wherein the reliability output unit is configured to produce the reliability output.

3. A method as claimed in claim 1,
wherein the specific one of the artificial neural networks is configured to assign a weight to the decision output based on the reliability output.

4. A method as claimed in claim 1,
wherein the specific one of the artificial neural networks is configured to ignore the decision output based on the reliability output.

5. A method as claimed in claim 1,
wherein building said artificial neural networks comprises employing neuroevolution of augmenting topologies.

6. A method as claimed in claim 1,
wherein the artificial neural networks are stored for subsequent use in a detection task.

7. A method as claimed in claim 6,
wherein each time series pattern to be detected represents a class of said detection task.

8. A method as claimed in claim 1,
wherein said time series patterns are audio patterns.

9. A method as claimed in claim 1,
wherein a raw time series signal is provided as an input to each artificial neural network that is built.

10. A method as claimed in claim 8,
wherein the audio patterns include at least one of the group of: voiced speech, unvoiced speech, user-specific speech, contextual sound, a sound event.

11. A computer program comprising non-transient instructions which, when executed, carry out or control a method as claimed in claim 1.

12. A system for facilitating detection of one or more time series patterns, comprising
a network building unit configured to build one or more artificial neural networks,
wherein, for at least one time series pattern to be detected, the network building unit is configured to build a specific one of said artificial neural networks,
the specific one of said artificial neural networks being configured to produce a decision output and a reliability output,
wherein the reliability output is indicative of the reliability of the decision output;
wherein the detection of the time series patterns forms part of a speaker authentication function;
wherein, for each speaker to be authenticated, at least one artificial neural network is built for detecting speech segments of said speaker; and
wherein, for each speaker to be authenticated, an artificial neural network is built for detecting voiced speech segments of said speaker, and another artificial neural network is built for detecting unvoiced speech segments of said speaker.

13. A method for facilitating detection of one or more time series patterns, comprising building one or more artificial neural networks,
wherein, for at least one time series pattern to be detected, a specific one of said artificial neural networks is built,
the specific one of said artificial neural networks being configured to produce a decision output and a reliability output,
wherein the reliability output is indicative of the reliability of the decision output;
wherein the detection of the time series patterns forms part of an audio pattern detection function;
wherein, for each audio pattern, at least one artificial neural network is built for detecting speech segments of one or more speakers within the audio pattern; and
wherein, for each speaker, an artificial neural network is built for detecting voiced speech segments of said speaker, and another artificial neural network is built for detecting unvoiced speech segments of said speaker.

* * * * *